Jan. 16, 1940. I. F. MELLINGER 2,187,136
TRAILER
Filed June 2, 1938 2 Sheets-Sheet 1

INVENTOR
Ira F. Mellinger
BY Evans + McCoy
ATTORNEYS

Jan. 16, 1940.  I. F. MELLINGER  2,187,136
TRAILER
Filed June 2, 1938   2 Sheets-Sheet 2

INVENTOR
Ira F. Mellinger
BY Evans & McCoy
ATTORNEYS

Patented Jan. 16, 1940

2,187,136

UNITED STATES PATENT OFFICE 2,187,136

TRAILER

Ira F. Mellinger, Leetonia, Ohio

Application June 2, 1938, Serial No. 211,352

8 Claims. (Cl. 280—33.4)

This invention relates to trailers adapted to be hitched to the rear end of an automobile, and has for its object to provide a trailer of the caster wheel type which is so supported on the draft vehicle and caster wheels and so cushioned that the torsional and other stresses, imparted to the trailer and draft vehicle frame due to relative movement caused by road surface irregularities, are reduced to a minimum.

It is an object of the present invention to provide a trailer construction in which the caster wheels are carried by semi-elliptic cushioning springs disposed longitudinally of the tractor frame in such manner that the pull on the trailer frame is yieldably transmitted through the springs to the caster wheels and is cushioned by the springs whereby the stresses on the caster wheel spindles and bearings and in the trailer and draft vehicle frame and draft connection due to sudden starting or road impacts are materially reduced.

A further object of the invention is to so connect the caster wheels together and to the springs and to the frame that road shocks are transmitted to the springs and effectively cushioned without distortions of either of the caster wheel supports or springs which would tend to cause breakage or excessive wear on the parts.

A further object of the invention is to provide supporting and draft applying connections between the trailer and draft vehicle which permits free relative vertical and lateral turning movements of the trailer and draft vehicle so that road impacts on the trailer wheels are practically all absorbed by the trailer supporting wheels and springs.

A further object is to provide a draft frame having forwardly diverging arms which are adjustable laterally to permit of attachment to the bumper supporting brackets of different automobiles.

With the above and other objects in view, the invention may be said to comprise the trailer illustrated in the accompanying drawings hereinafter described and particularly set forth in the appended claims together with such variations and modifications thereof as will be apparent to one skilled in the art to which the invention appertains.

Reference should be had to the accompanying drawings forming a part of this specification, in which.

Figure 1:
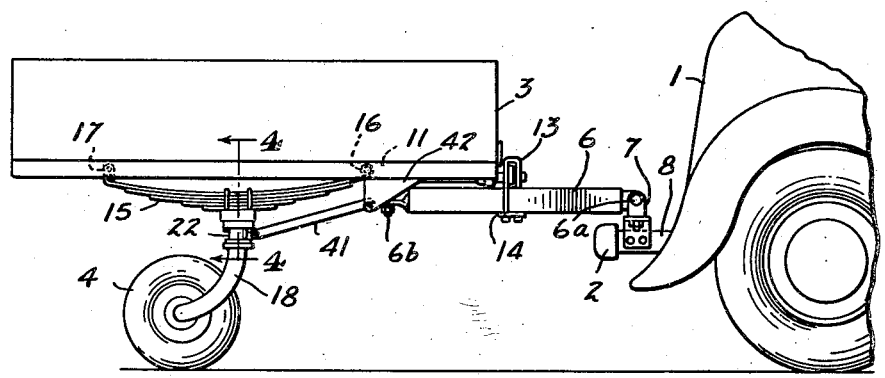
Figure 1 is a side elevation of a trailer embodying the invention fixed to the rear end of an automobile.
Figure 2:
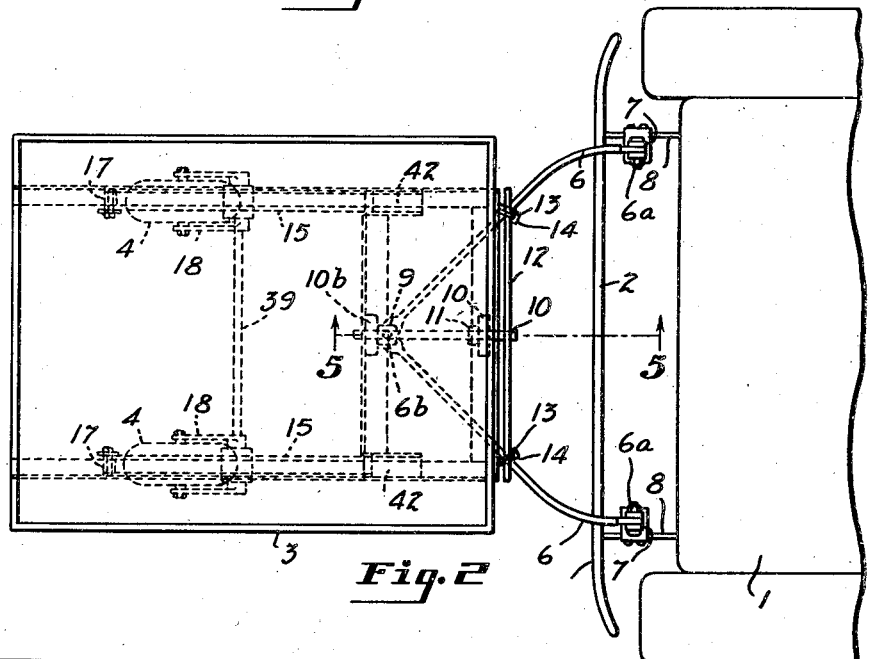
Fig. 2 is a top plan view of the trailer and the trailer supporting draft connections.
Figure 3:
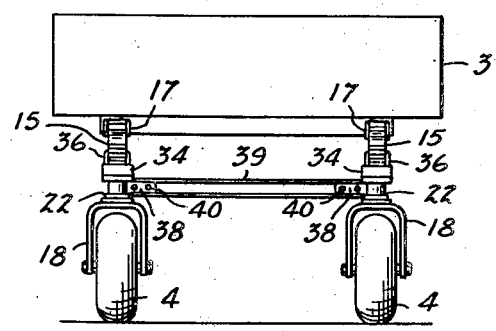
Fig. 3 is a rear elevation of the trailer.

The trailer of the present invention is designed for attachment to the rear end of a suitable draft vehicle and in the accompanying drawings there is shown the rear end of an automobile 1 having a rear bumper 2 to which the trailer is attached. The trailer has a frame or body 3 which is so supported upon a pair of caster wheels 4 that the greater portion of the weight thereof is imposed upon the caster wheels. The caster wheels 4 are preferably pneumatic tired and the trailer body is spring supported. The caster wheels 4 are positioned slightly behind the longitudinal center of the trailer frame so that a portion of the weight thereof is imposed upon the draft vehicle.

One of the most serious objections to the use of trailers with passenger automobiles is that in traveling at high speeds the frames of both the trailer and the draft vehicle are subjected to severe stresses due to relative movements of the two frames, which are resisted by the coupling elements. The trailer supporting and coupling device of the present invention is designed to permit a freedom of relative movement such that impacts upon the wheels of the vehicle and trailer are independently cushioned.

The trailer is connected to the automobile by means of forwardly diverging draft arms 6 which are connected by horizontal pivots 6a to brackets 7 which are rigidly secured to the attaching arms 8 of the automobile bumper 2. The rear ends of the arms 6 are connected by a vertical pivot 6b to a block 9 fixed to a longitudinal shaft 10 journaled beneath the trailer body centrally thereof. The shaft 10 is journaled in front and rear bearings 10a and 10b which are detachably secured to the under side of the trailer body. The shaft 10 is held against endwise movement by the block 9 which is disposed immediately in front of the rear bearing 10b and a second block 11 fixed to the shaft and located immediately to the rear of the bearing 10a. The shaft 10 extends a short distance past the forward end of the trailer body 3 and has rigidly secured thereto a cross bar 12 which overlies the diverging arms 6 and is clamped to each arm 6 by means of a clamp consisting of a U-bolt 13 straddling the arm and cross bar and a clamping plate 14 which bears against the under sides of the arms 6.

The draft arms 6, cross bar 12, and shaft 10 provide a rigid A-shaped draft frame for supporting the forward end of the trailer body. The draft frame and trailer are free to swing vertically about the horizontal transverse axis provided by the pivots 6a, and the shaft 9 provides a longitudinal pivot about which the trailer body 3 may rock laterally. During travel over uneven surfaces, the trailer and automobile are free to accommodate themselves independently to the irregularities over which the wheels are passing without excessive strain on the vehicle frames due to the relative rocking movements permitted by the pivots 6a and the shaft 10. The trailer, however, is positively held in line with the automobile frame by the rigid A-frame draft member to which it is connected by the spaced bearing members 10a and 10b.

In order to provide a strong connection and to avoid damage to the automobile bumper it is desirable that the draft arms 6 be always connected to the arms 8 by which the bumper is attached to the automobile frame since these arms 8 are spaced differently in different automobiles, it is desirable that the draft arms 6 be adjustable laterally so that the brackets 8 may be attached to the bumper attaching arms of any automobile. Such adjustment of the draft arms 6 may be made by loosening the clamping bolts 13 and sliding the arms 6 inwardly or outwardly on the bar 12. After the arms 6 have been adjusted to the proper position the bolts 13 may be tightened to clamp the bar 12 to the arms 6.

The frame 3 is cushioned by means of semielliptic springs 15 interposed between the trailer frame and caster wheels. These springs are disposed longitudinally of the trailer frame adjacent opposite sides thereof. The forward ends of the springs 15 are connected to the trailer frame 3 by pivots 16 located in advance of the longitudinal center of the trailer. The rear ends of the springs 15 have a floating action with the trailer frame provided by shackles 17 which permit the rear ends of the springs to move rearwardly as they are flattened by thrusts imposed thereon.

Figure 4:
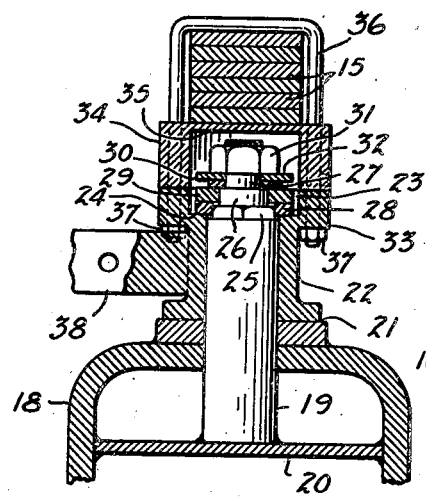
Fig. 4 is a section taken on the line indicated at 4—4 in Fig. 1.
Figure 5:
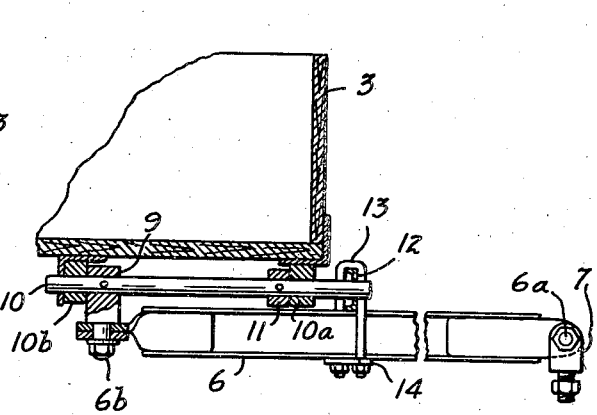
Fig. 5 is a section taken on the line indicated at 5—5 in Fig. 2.
Figure 6:
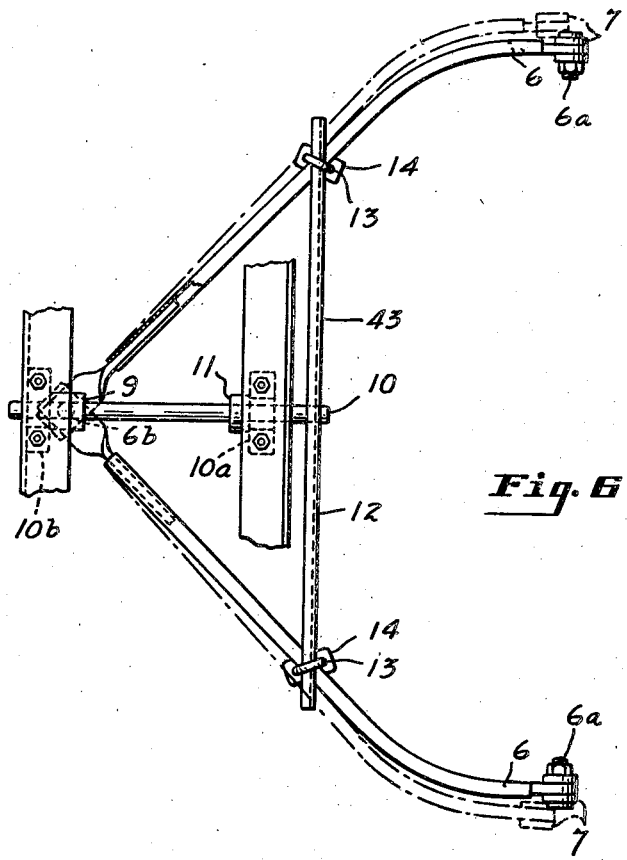
Fig. 6 is a top plan view showing the draft connection on an enlarged scale.

Each wheel 4 is supported on a fork 18 which carries a spindle 19 at its upper ends. As best shown in Fig. 4 of the drawings, the spindle 19 extends through an aperture in the top of the fork 18 and is rigidly attached at its lower end to a cross bar 20 which extends across the space between the arms of the fork 18 and is rigidly attached to said arms by welding or other suitable means. On the top thereof the fork 18 has a bearing shoulder 21 surrounding the spindle 19 to receive the base of a bearing member 22 which has a central bore in which the spindle 19 has a rotating fit. At the top thereof the bearing member 22 has a counterbore 23 providing a bearing shoulder 24 around the upper portion of the spindle. The portion of the spindle 19 which projects through the top of the bearing member 22 is stepped to provide a square portion 25 within the bearing shoulder 24, a smaller round portion 26 above the square portion 25 and a reduced threaded end portion 27. A bearing washer 28 is mounted upon the square portion 25 of the spindle and engages the bearing shoulder 24. A second washer 29 fits upon the round reduced portion 26 of the spindle and rests upon the top of the bearing washer 28. A lock washer 30 is mounted on the reduced end portion 27 of the spindle and the washers 28, 29, and 30 are clamped by means of a nut 31 and an interposed washer 32. The bearing member 22 has a laterally extending flange 33 at the top thereof which provides a support for the cap 34 which is provided with a recess 35 to receive the projecting end of the spindle 19. The recess 35 and counterbore 23 provide a closed chamber at the top of the spindle which may be packed with grease or other lubricant. The caster wheel support is rigidly clamped to the central portion of the semi-elliptic spring directly beneath the spring by means of U-bolts 36 which straddle the spring 15 with the ends thereof extending downwardly through apertures in the cap 34 and flange 33. Nuts 37 on the ends of the bolt 36 serve to clamp bearing member 22 and interposed cap 34 firmly against the bottom of the spring 15.

Each of the bearing members 22 is provided on the inner side thereof with an integral, laterally extending lug 38. The lugs 38 of the two bearing members provide means for attaching a cross bar 39 which may be in the form of a channel connected by bolts 40 to the lugs 38. The cross bar 39 provides a rigid connection between the two caster wheel supports and serve to prevent independent lateral deflections of the caster wheel frames, which would impart torsional stresses to the springs 15. Each caster wheel support is independently removable as a unit for replacement or repair by simply removing the bolts 36 and 40.

The caster wheel supports, directly attached to the springs 15, have considerable vertical movement with respect to the trailer frame 3. Flattening of either spring 15 causes a rearward movement of the bearing member 22 and the caster wheel support relative to the frame 3. Road impacts and sudden jerks in starting impose a strong rearward thrust on the caster wheel supports and such thrusts are cushioned by the springs 15. Since the rearward thrusts on the downwardly projecting wheel supports attached to the springs are often very severe and the cantilever action of these supports on the springs would subject the weaker end portions of the spring to bending stresses, it has been found desirable to provide auxiliary brace members which prevent the transmission of such stresses to the springs 15. The auxiliary braces are in the form of brace rods 41 which are pivotally connected at their rear ends to the bearing members 22 and at their forward ends to brackets 42 attached to the frame 3 adjacent the pivots 16. The brace rods 41 are positioned directly beneath the forward ends of the springs 15 and are disposed substantially parallel with the forward end portions of the springs, the pivotal connections of the rods 41 to the brackets 42 being substantially beneath the pivots 16 of the springs. The brace rods 41 maintain the caster spindles 19 and bearings 22 substantially in vertical position during the flexing of the springs 15, and relieve the springs to a great extent of the cantilever thrusts imposed upon the caster wheel supporting members.

It will be apparent that the construction of the present invention enables the pull to be transmitted to the trailer frame and its supporting wheels in such manner that the longitudinal jerks due to sudden starting and road impacts on the trailer wheels are effectively cushioned. Also, longitudinal alinement of the trailer with the automobile is maintained and free relative tilting movements of the automobile and trailer are permitted, so that the springs of both the automobile and trailer have free cushioning action. Wear and tear on the pneumatic tires is reduced by avoiding the imposition of excessive load on the individual tires and the lateral dragging of tires on the road surface. Furthermore, these results are accomplished by means of a construction which is simple and inexpensive.

It is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A trailer comprising a frame, semi-elliptic springs attached to the frame adjacent opposite sides thereof and extending longitudinally of the frame, a bearing member beneath each spring and rigidly secured to the central portion of the spring, a rigid cross bar connecting said bearing members, and two caster wheel supports, each having a vertical spindle journalled in one of said bearing members and positioned directly beneath a spring.

2. A trailer comprising a frame, semi-elliptic springs attached to the frame adjacent opposite sides thereof and extending longitudinally of the frame, a bearing member rigidly secured to each of said springs intermediate the ends thereof, a rigid cross bar connecting said bearing members, two caster wheel supports, each having a vertical spindle journalled in one of said bearing members, and a brace rod for each caster wheel support pivotally connected at one end to the frame and at its opposite end to one of said bearing members.

3. A trailer comprising a frame, semi-elliptic springs attached to the frame adjacent opposite sides thereof and extending longitudinally of the frame, a bearing member rigidly secured to each of said springs intermediate the ends thereof, a rigid cross bar connecting said bearing members, two caster wheel supports, each having a vertical spindle journalled in one of said bearing members, and a brace rod for each caster wheel support, each brace rod being pivotally connected at its opposite ends to the frame and to one of said bearing members, each brace rod extending forwardly from its bearing member and positioned beneath and substantially parallel to a spring.

4. The combination with a draft vehicle having a frame, of a trailer having a frame, a draft connection between the trailer and vehicle frames connected to said frames to swing with respect thereto about longitudinal and transverse axes, and cushioned supporting means for said trailer frame comprising, longitudinal semi-elliptic springs, each pivotally attached at its forward end to said trailer frame forwardly of the longitudinal center thereof and having a floating connection at its rear end to said frame rearwardly of the longitudinal center of the frame, a bearing member rigidly attached to the central portion of each spring, a cross bar connecting said bearing members, and caster wheel supports having spindles journalled in said bearing members.

5. The combination with a draft vehicle having a frame, of a trailer having a frame, a draft connection between the trailer and vehicle frames connected to said frames to swing with respect thereto about longitudinal and transverse axes, and cushioned supporting means for said trailer frame comprising, longitudinal semi-elliptic springs, each pivotally attached at its forward end to said trailer frame forwardly of the longitudinal center thereof and having a floating connection at its rear end to said frame rearwardly of the longitudinal center of the frame, a bearing member rigidly attached to the central portion of each spring, a cross bar connecting said bearing members, caster wheel supports having spindles journalled in said bearing members, and a brace rod for each caster wheel support pivoted at its rear end to the spindle bearing, extending forwardly substantially parallel to the forward portion of the spring and pivoted at its forward end to the trailer frame substantially beneath the forward spring pivot.

6. In a vehicle of the character described, a leaf spring, a caster wheel support comprising a spindle and a fork rigidly attached to the spindle, said fork having a bearing shoulder around the spindle, a bearing member provided with a bore to receive said spindle and having its base seated on said shoulder, said bearing member having laterally extending flanges at the top thereof, a cap having edge portions resting on said flanges, and U-bolts extending over said spring and through the cap and flanges for rigidly clamping said cap and bearing member against the under side of said spring.

7. A vehicle of the character described, comprising a frame, a pair of longitudinally extending semi-elliptic springs, a caster wheel support attached to each spring, each support comprising a spindle and a fork rigidly attached to the spindle, a bearing member rigidly attached to the under side of each spring, each bearing member having a vertical bore to receive a spindle and an integral laterally projecting lug, and a cross bar rigidly attached at its ends to the lugs of said bearing members.

8. A vehicle of the character described, comprising a frame, a pair of longitudinally extending semi-elliptic springs, a caster wheel support attached to each spring, each support comprising a spindle and a fork rigidly attached to the spindle, a bearing member rigidly attached to the under side of each spring, each bearing member having a vertical bore to receive a spindle and an integral laterally projecting lug, a cross bar rigidly attached at its ends to the lugs of said bearing members, and brace rods extending forwardly from said bearing members substantially parallel with the springs and pivoted to the frame and to said bearing members.

IRA F. MELLINGER.